United States Patent
May et al.

(10) Patent No.: US 6,180,750 B1
(45) Date of Patent: Jan. 30, 2001

(54) MODIFIED POLYESTERS

(75) Inventors: Michael May, Griesheim; Michael Wicker, See-heim-Jugenheim, both of (DE)

(73) Assignee: Roehm GmbH, Darmstadt (DE)

( * ) Notice: Under 35 U.S.C. 154(b), the term of this patent shall be extended for 0 days.

(21) Appl. No.: 09/319,939

(22) PCT Filed: Nov. 19, 1997

(86) PCT No.: PCT/EP97/06457

§ 371 Date: Jul. 20, 1999

§ 102(e) Date: Jul. 20, 1999

(87) PCT Pub. No.: WO98/27158

PCT Pub. Date: Jun. 25, 1998

(30) Foreign Application Priority Data

Dec. 18, 1996 (DE) .............................................. 196 52 757

(51) Int. Cl.⁷ ..................................... C08G 63/02

(52) U.S. Cl. ............................................ 528/272; 528/271

(58) Field of Search ..................................... 528/176, 271, 528/272; 524/492, 494

(56) References Cited

U.S. PATENT DOCUMENTS 5,302,429 * 4/1994 Nazir et al. ......................... 428/35.7
5,352,500 * 10/1994 Nazir et al. ......................... 428/35.7

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

The invention concerns the use of a copolymer comprising (a) between 60 and 98 wt % methylmethacrylate, and (b) between 2 and 40 wt % styrene, and optionally (c) between 0 and 20 wt % maleic acid anhydride, as modifying agents for increasing the melt viscosity for partially crystalline, partially aromatic polyesters, with the exception of polybutylene terephthalate containing intensifier fillers.

9 Claims, No Drawings

MODIFIED POLYESTERS

This invention relates to the use of methyl methacrylate/ styrene copolymers as melt rheology modifiers for partially crystalline, partially aromatic polyesters. The invention also relates to modified polyesters and moldings produced from them.

STATE OF THE ART

Because of their extraordinarily good solvent resistance and their good processability in principle with low shrinkage, partially crystalline, partially aromatic polyesters such as polyethylene terephthalate and polybutylene terephthalate, for example, are widely used, especially in the packaging industry, for example for food packages, in automobile manufacture, or in the textile industry, for example in fiber production. Many moldings, for example beverage bottles, fuel tanks, vacuum systems, etc., are manufactured from these materials by injection molding or extrusion blow-molding.

U.S. Pat. No. 4,179,479 describes plastic blends that can consist of at least 40 wt. % polyurethane and at most 60 wt. % polybutylene terephthalate and can contain 0.5–10 wt. % polyacrylate polymers with a molecular weight (number average) of 500,000 to 1,500,000 as processing aids. The polyacrylate can be a terpolymer of methyl methacrylate, n-butyl acrylate, and styrene, among others. No information is given on the proportions of monomeric components.

EP 0 328 273 B1 describes melt rheology modifiers for thermoplastic resins consisting of polymers with an average molecular weight of 1,500,000 to 10,000,000 of (meth) acrylic monomers with groups that can be alkyl, substituted alkyl, cycloalkyl, aryl, aralkyl, or alkaryl.

Example 58A describes the modification of polybutylene terephthalate with 10 wt. % of a polymer of 74% methyl methacrylate, 24% butyl methacrylate, and 2% methacrylic acid, with a molecular weight of $4.9 \times 10^6$. The extrusion sag time in sec (a measure of melt viscosity) is increased by the added modifier from 5.2 to 10.5 compared to unmodified polybutylene terephthalate.

U.S. Pat. No. 5,352,500 claims blow-molded articles of a thermoplastic resin containing about 1–25 wt. % of a methacrylate polymer that consists of 70 wt. % (meth)acrylic monomers with groups that can be alkyl, substituted alkyl, cycloalkyl, aryl, aralkyl, or alkaryl. In Examples 2–4, the modification of a blend of polybutylene terephthalate and polycarbonate (43/57) is shown with an impact strength modifier based on polymethyl methacrylate/styrene with core-shell structure. The modification leads to an increase of extrusion sag time in sec (a measure of melt viscosity).

DE-OS 23 64 318 describes the modification of poly(1, 4-butylene terephthalate) or its copolyesters with a smaller amount of an aliphatic or aromatic dicarboxylic acid or of an aliphatic polyol containing 1–80 wt. % of a reinforcing filler in the form of reinforcing metals, ceramic materials, silicates, quartz, glass, and carbon, by the addition of interpolymers or copolymers that contain styrene compounds. For example, the addition of an interpolymer of polypropylene and rubber-modified styrene to fiberglass-reinforced polybutylene terephthalate brings about improved hot dimensional stability and improved impact strength of the plastic. Among a number of suitable copolymers, those of methyl methacrylate and styrene are also mentioned. The effect of increasing the melt viscosity is not reported and also not obvious, since many of the mentioned additives in contrary manner lead to a lower melt viscosity.

Problem and Solution

A fundamental problem when processing partially crystalline, partially aromatic types of polyesters, for example polyethylene terephthalate or polybutylene terephthalate, consists of the fact that the viscosity declines very rapidly after surpassing the melting temperature. This can lead to production defects, especially the formation of holes, during extrusion blow-molding, or the breakage of strands during extrusion or fiber-spinning.

It was considered to be the objective to modify partially crystalline, partially aromatic polyesters so that the melt viscosity is clearly increased, but the other characteristics of these polyesters, especially the partially crystalline nature of the plastic, are not impaired or only insignificantly impaired.

The problem was solved by the use of a copolymer of a) 60–98 wt. % methyl methacrylate and b) 2–40 wt. % styrene and optionally c) 0–20 wt. % maleic anhydride as modifier to increase the melt viscosity of partially crystalline, partially aromatic polyesters, with the exception of poly(1,4-butylene terephthalate) or its copolyesters with a smaller amount of an aliphatic or aromatic dicarboxylic acid or of an aliphatic polyol containing 1–80 wt. % of a reinforcing filler in the form of reinforcing metals, ceramic materials, silicates, quartz, glass, and carbon.

The use pursuant to the invention of the copolymer as modifier (melt rheology modifier) makes possible improved processability of the partially crystalline, partially aromatic polyester, especially of polyethylene terephthalate and polybutylene terephthalate (with the exception of polybutylene terephthalate containing reinforcing fillers as claimed in DE-OS 23 64 318), because their melt viscosity increases substantially. At the same time, the other positive characteristics of the polyesters, especially partial crystallinity, are retained.

This is surprising, since although pure polymethyl methacrylate, for example with a solution viscosity in chloroform of about 50 ml/g according to ISO 1628-6, has a distinctly higher melt viscosity $\eta_s$, about 800 Pas at 230° C./5 MPa, than that of polymethyl methacrylate/styrene copolymers, the desired effect is obtained only by the use of the copolymers pursuant to the invention. It is assumed that this is attributable to the ratios of the polymer melts in the blend.

A modified partially crystalline, partially aromatic polyester, also claimed, is obtained by the use pursuant to the invention of the copolymers as modifiers to increase melt viscosity. This is suitable for producing moldings, especially moldings produced by blow-molding.

Implementation of the Invention

Partially crystalline, partially aromatic polyesters in the context of this invention means products of condensation of terephthalic acid with aliphatic diol components such as ethylene glycol or 1,4-butanediol or with mixtures of diols. Examples of these are polyethylene terephthalate and polybutylene terephthalate.

The invention is particularly suitable for polyethylene terephthalate and polybutylene terephthalate. Polybutylene terephthalate is especially preferred.

Polybutylene terephthalate in the context of the invention means polymers that consist essentially of butylene terephthalate units. These are polymers containing at least about 95, preferably at least 98 wt. % butylene terephthalate or more. Polybutylene terephthalates can optionally also contain small fractions of other diol components, for example ethylene glycol. Mixtures with small amounts, e.g. 5–20%, of compatible polymers such as polycarbonate and/or acrylonitrile/butadiene/styrene copolymers (ABS) can also be present.

Polyethylene terephthalate in the context of the invention means polymers that consist essentially of ethylene terephthalate units. These are polymers containing at least about 95, preferably at least 98 wt. % ethylene terephthalate or more. Polyethylene terephthalates can optionally also contain small fractions of other diol components, for example butanediol. They can also contain inorganic fillers such as talc or glass fibers. Mixtures with small amounts, e.g. 5–20%, of compatible polymers such as polycarbonate and/or acrylonitrile/butadiene/styrene copolymers (ABS) can also be present.

The Modifiers for Increasing the Melt Viscosity of Partially Crystalline, Partially Aromatic Polyesters The copolymers consist of a) 60–98 wt. % methyl methacrylate and b) 2–40 wt. % styrene and optionally c) 0–20 wt. % maleic anhydride and can be prepared by known methods from the monomers a.), b.), and c.) by radical, anionic, or group transfer polymerization. The polymerization can be carried out in bulk, suspension, emulsion, or solution.

To prepare the mixtures of the melt rheology modifier with polybutylene terephthalate (PBT), the polybutylene terephthalate as a granulate, for example, can be premixed with the copolymer, that may be used as a ground product or as a granulate, in slow mixers, for example drum, cage, or double-chamber plow-blade mixers.

Premixes prepared in this way are then processed into homogeneous plastic mixtures in heated mixing units at suitable temperatures, for example between 180° C. and 300° C., in kneaders or preferably in extruders, for example in single- or multiple-screw extruders, or optionally in extruders with oscillating screws and shear pins (kneaders from Buss Co.).

Radical polymerization of the monomers is preferred in the presence of polymerization initiators and optionally molecular weight regulators. The average molecular weight $M_w$ (weight average) is about 100,000 to 1,000,000, preferably in the range of 150,000 to 500,000, and with special preference in the range of 200,000 to 400,000. The molecular weight $M_w$ can be determined, for example, by gel permeation chromatography or by light scattering methods (for example, see H. F. Mark et al., Encyclopedia of Polymer Science and Engineering, 2nd edition, Vol. 10, pages 1 ff, J. Wiley, 1989).

Melt rheology modifiers containing 70–95 wt. %, especially 80–90 wt. % methyl methacrylate, 5–30 wt. %, especially 10–20 wt. % styrene, and optionally 0–15 wt. % maleic anhydride are preferred. Maleic anhydride as comonomer can be omitted as a rule especially for melt rheology modifiers with higher molecular weight, above about 180,000, preferably 200,000.

It is not absolutely necessary, but optionally possible, for other copolymerizable monomers such as alkyl(meth) acrylates with 2 to 8 carbon atoms in the alkyl group to be included in amounts of 0–10 wt. %, preferably 5 wt. % at the most.

Examples of the other possible comonomers optionally included in fractions of 0–10% are methyl acrylate, ethyl acrylate, ethyl methacrylate, n-butyl acrylate, n-butyl methacrylate, hexyl methacrylate, cyclohexyl acrylate, or cyclohexyl methacrylate.

Modified Partially Crystalline, Partially Aromatic Polyesters

Modified partially crystalline, partially aromatic polyesters are obtained by admixing the melt rheology modifiers. This can be done in the simplest case by premixing granulate or powders and then extruding them. The molding composition thus obtained can be either processed directly or granulated into a modified partially crystalline, partially aromatic polyester blend.

The amounts of the melt rheology modifier used are in the range of 0.5 to 40 wt. %, preferably 2–35 wt. % based on the total weight of the mixture. The desired increase of melt viscosity is found even starting at about 0.5 wt. %. The amounts used are preferably 5–35 wt. %, especially 10–35 wt. %, and with special preference 15–35 wt. %.

The modified partially crystalline, partially aromatic polyesters can be processed in principle like unmodified polyesters, by extrusion, injection molding, hot forming, melt-spinning processes, or preferably blow-molding. The usual processing temperatures are in the range of 250–290° C.

The modified partially crystalline, partially aromatic polyester pursuant to the invention can be processed readily above the melting temperature because the viscosity of the melt is increased substantially. At the same time, the melt enthalpy, determined by DSC (Differential Scanning Method, in this regard cf. Brandrup, J., and Immergut, E. H., (1975): Polymer Handbook, III, pp. 144–148, Wiley, J.) as an index of solvent resistance corresponding to the mass fraction, stays nearly unchanged. Very distinct benefits are obtained, especially in blow-molding, where very uniform wall thicknesses are required in the molded parts produced. The melt of the molten tubes produced by extrusion has less tendency to warp under the action of gravity. The tolerable temperature range in which the moldings can be processed without rejects is broadened. This makes more reliable production possible and also permits increasing the processing temperatures and with them the cycle times, which leads to overall improved economy.

EXAMPLES

The invention will be described by the following examples, the results of which are summarized in Table 1.

The solution viscosities (ml/g) were determined in chloroform according to ISO 1628-6. The melt viscosity $\eta_s$ (Pas) was determined according to DIN 54 811 Procedure B. The melt enthalpy (J/g) was determined by DSC (Differential Scanning Method).

A polybutylene terephthalate homopolymer (Vestodur 1000 from Hüls AG, Marl, Germany) was used in Examples 1–29. The copolymers in Example 2–29 were synthesized as described below, crushed, premixed with polybutylene terephthalate granulate, and then processed into a homogeneous melt in a single-screw extruder at 280° C. The measurements were made on granulate specimens.

Example 1

Comparison example with pure polybutylene terephthalate (PBT).

Examples 2–5

Copolymer of 90 wt. % methyl methacrylate and 10 wt. % styrene. To a monomer mixture of 7200 g methyl methacrylate and 800 g styrene are added 16 g dilauroyl peroxide and 4 g 2,2-bis(tert-butylperoxy)butane, as initiators, and 28 g n-dodecyl mercaptan as molecular weight regulator. As much oxygen as possible is removed from this solution in a polymerization chamber, first over Dry Ice, for 15 minutes, by applying a vacuum. Polymerization is then carried out on a water bath for 5 hours at 65° C. and 17 hours at 55° C. For final polymerization, the product is then heated in a drying oven for 12 hours at 120° C.

The polymer has a solution viscosity in chloroform of 66 ml/g according to ISO 1628-6.

Examples 6–9

Copolymer of 90 wt. % methyl methacrylate and 10 wt. % styrene.

The preparation is analogous to the procedure described above. 16 g n-dodecyl mercaptan is used as molecular weight regulator. The polymer has a solution viscosity in chloroform of 99 ml/g according to ISO 1628-6.

Examples 10–13

Copolymer of 85 wt. % methyl methacrylate and 15 wt. % styrene.

The preparation is analogous to the procedure described above. 28 g n-dodecyl mercaptan is used as molecular weight regulator. The polymer has a solution viscosity in chloroform of 77 ml/g according to ISO 1628-6.

Examples 14–17

Copolymer of 85 wt. % methyl methacrylate and 15 wt. % styrene.

The preparation is analogous to the procedure described above. 16.8 g n-dodecyl mercaptan is used as molecular weight regulator. The polymer has a solution viscosity in chloroform of 105 ml/g according to ISO 1628-6.

Examples 18–21

Copolymer of 80 wt. % methyl methacrylate and 20 wt. % styrene.

The preparation is analogous to the procedure described above. 28 g n-dodecyl mercaptan is used as molecular weight regulator. The polymer has a solution viscosity in chloroform of 77 ml/g according to ISO 1628-6.

Examples 22–25

Copolymer of 80 wt. % methyl methacrylate and 20 wt. % styrene.

The preparation is analogous to the procedure described above. 16 g n-dodecyl mercaptan is used as molecular weight regulator. The polymer has a solution viscosity in chloroform of 106 ml/g according to ISO 1628-6.

Examples 26–29

Copolymer of 75 wt. % methyl methacrylate, 15 wt. % styrene, and 10 wt. % maleic anhydride.

The preparation is analogous to the procedure described above. 3.36 g dilauroyl peroxide and 0.8 g tert-butyl perisononanoate are used as polymerization initiators, and 13.4 g 2-mercaptoethanol as molecular weight regulator. The polymerization is carried out on a water bath for 6 hours at 60° C. and 25 hours at 50° C. The polymer has a solution viscosity in chloroform of 65 ml/g according to ISO 1628-6.

TABLE 1

Summary of the results from Examples 1–29

| Ex. No. | MRM MMA/SR/MA | SV ml/g | Ratio MRM:PBT | Melt viscosity 230° C./5 MPa $\eta_s$ (Pas) | Melt enthalpy (J/g) |
|---|---|---|---|---|---|
| 1  | —       | —   | 0:100  | 264 | 33.6 |
| 2  | 90/10/0 | 66  | 5:95   | 290 |      |
| 3  | 90/10/0 | 66  | 10:90  | 314 |      |
| 4  | 90/10/0 | 66  | 20:80  | 415 |      |
| 5  | 90/10/0 | 66  | 30:70  | 518 |      |
| 6  | 90/10/0 | 99  | 5:95   | 356 |      |
| 7  | 90/10/0 | 99  | 10:90  | 398 |      |
| 8  | 90/10/0 | 99  | 20:80  | 429 |      |
| 9  | 90/10/0 | 99  | 30:70  | 582 |      |
| 10 | 85/15/0 | 77  | 5:95   | 354 |      |
| 11 | 85/15/0 | 77  | 10:90  | 398 | 40.6 |
| 12 | 85/15/0 | 77  | 20:80  | 684 | 33.9 |
| 13 | 85/15/0 | 77  | 30:70  | 870 | 34.8 |
| 14 | 85/15/0 | 105 | 5:95   | 318 |      |
| 15 | 85/15/0 | 105 | 10:90  | 556 |      |
| 16 | 85/15/0 | 105 | 20:80  | 609 |      |
| 17 | 85/15/0 | 105 | 30:70  | 705 |      |
| 18 | 80/20/0 | 77  | 5:95   | 428 |      |
| 19 | 80/20/0 | 77  | 10:90  | 381 |      |
| 20 | 80/20/0 | 77  | 20:80  | 698 |      |
| 21 | 80/20/0 | 77  | 30:70  | 683 |      |
| 22 | 80/20/0 | 106 | 5:95   | 424 |      |
| 23 | 80/20/0 | 106 | 10:90  | 464 |      |
| 24 | 80/20/0 | 106 | 20:80  | 536 |      |
| 25 | 80/20/0 | 106 | 30:70  | 718 |      |
| 26 | 75/15/10| 65  | 5:95   | 398 |      |
| 27 | 75/15/10| 65  | 10:90  | 463 |      |
| 28 | 75/15/10| 65  | 20:80  | 507 |      |
| 29 | 75/15/10| 65  | 30:70  | 486 |      |

Abbreviations:
SV = Solution viscosity in chloroform according to ISO 1628-6
MRM = Melt rheology modifier
MMA = Methyl methacrylate, SR = Styrene, MA = Maleic anhydride

What is claimed is:

1. A method for modifying to increase the melt viscosity of a composition of a partially crystalline, partially aromatic polyesters, with the exception of poly(1,4-butylene terephthalate) or its copolyesters with a smaller amount of an aliphatic or aromatic dicarboxylic acid or of an aliphatic polyol containing 1–80 wt. % of a reinforcing filler in the form of reinforcing metals, ceramic materials, silicates, quartz, glass, and carbon, comprising modifying said composition to increase its melt viscosity, by admixing therewith as a modifier, a copolymer of a) 60–80 wt. % methyl methacrylate and b) 2–40 wt. % styrene and optionally c) 0–20 wt. % maleic anhydride.

2. The method according to claim 1, comprising modifying polybutylene terephthalate to increase its melt viscosity.

3. The method according to claim 1, comprising modifying polyethylene terephthalate to increase its melt viscosity.

4. The method according to claim 1, wherein said modifier is admixed in an amount of 0.5 to 40 wt. % based on the total weight of the mixture.

5. Modified composition of a partially crystalline, partially aromatic polyester, with the exception of poly(1,4-butylene terephthalate) or its copolyesters with a smaller amount of an aliphatic or aromatic dicarboxylic acid or of an aliphatic polyol containing 1–80 wt. % of a reinforcing filler in the form of reinforcing metals, ceramic materials, silicates, quartz, glass, and carbon, wherein said composition contains as modifier 0.5–40 wt. % of a copolymer consisting of a) 60–80 wt. % methyl methacrylate and b) 2–40 wt. % styrene and optionally c) 0–20 wt. % maleic anhydride.

6. Modified polyester according to claim 5, characterized by the fact that the polyester is polybutylene terephthalate.

7. Modified polyester according to claim 5, characterized by the fact that the polyester is polyethylene terephthalate.

8. Molding from a modified polyester according to claim 5.

9. Molding according to claim 8, characterized by the fact that it is produced by extrusion blow-molding.

* * * * *

UNITED STATES PATENT AND TRADEMARK OFFICE
CERTIFICATE OF CORRECTION

PATENT NO.    : 6,180,750 B1
DATED         : January 30, 2001
INVENTOR(S)   : Michael May et al.

It is certified that error appears in the above-identified patent and that said Letters Patent is hereby corrected as shown below:

<u>Column 6,</u>
Lines 47-48, "60-80 wt. % methyl methacrylate" should read -- 60-98 wt.% methyl methacrylate --
Line 65, "60-80 wt. % methyl methacrylate" should read -- 60-98 wt.% methyl methacrylate --

Signed and Sealed this

Twenty-fifth Day of February, 2003

JAMES E. ROGAN
*Director of the United States Patent and Trademark Office*